United States Patent Office 2,961,774
Patented Nov. 29, 1960

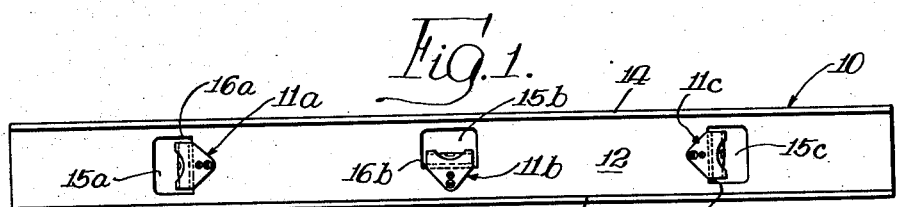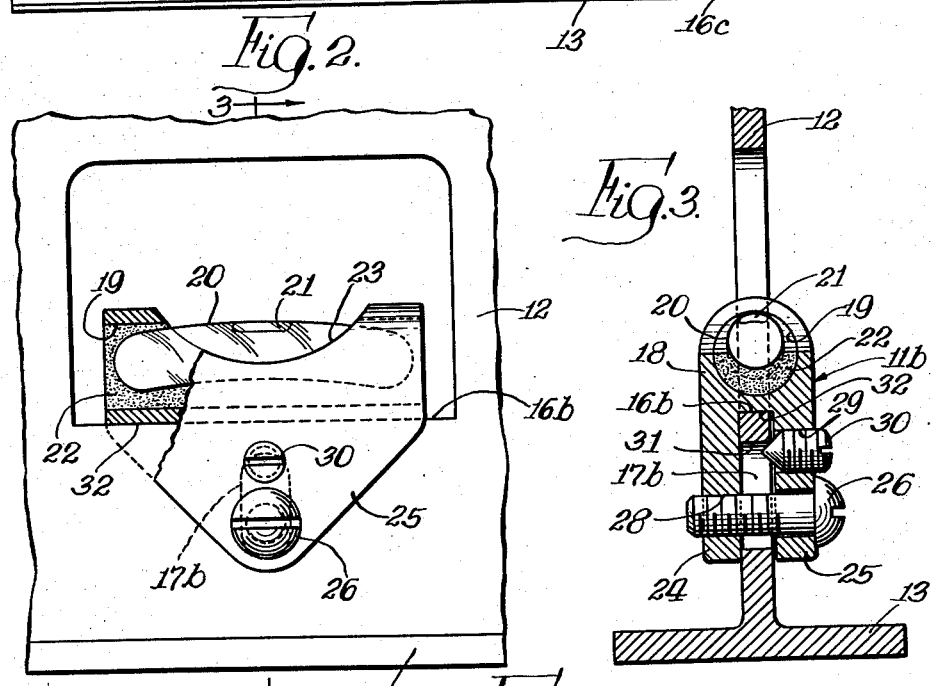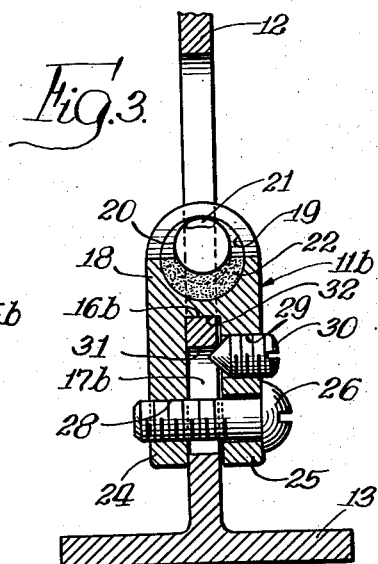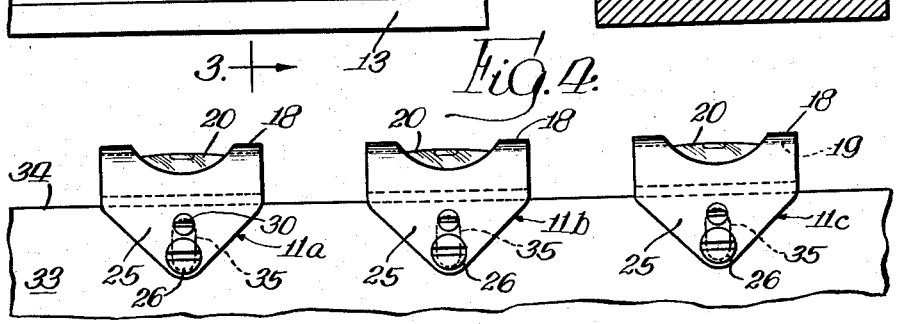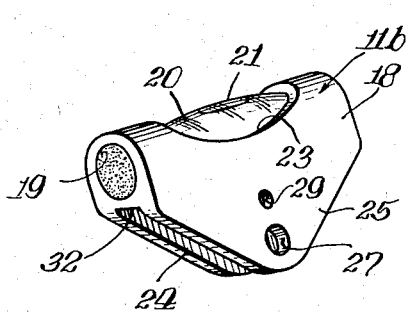

2,961,774

SPIRIT LEVEL

Raymond C. Dreier, 6930 South Shore Drive, Chicago, Ill.

Filed Feb. 7, 1957, Ser. No. 638,724

7 Claims. (Cl. 33—211)

This invention relates to spirit levels, and more particularly to a method of making interchangeable level vial assemblies and to the structure therefor.

Spirit levels are well known in the art, and ordinarily comprise a level frame provided with at least one straight edge and a bubble vial mounted in the frame so that the bubble in the vial is centered when the straight edge is in a horizontal plane. It is apparent that the bubble vial could also be mounted in the frame with the bubble centered when the straight edge is in a true vertical position. To increase the utility of such spirit levels, they are most frequently equipped with two bubble vials—one mounted for horizontal leveling and the other for vertical plumbing.

These levels are supplied in various sizes and are used in numerous fields, and are most often seen in connection with the building trades. Because of the fields of use for levels, they receive rather rough treatment with the result that the bubble vial which is made of glass is often broken, whereby the level is of no value. To meet this difficulty, levels have been designed which have replaceable vial assemblies so that if a vial is broken, the assembly thereof is removed from the level frame and a new vial assembly substituted therein. However, in levels designed for replacement of the vial assemblies thereof, there is no assurance that the substituted bubble vial will perfectly match the position of the one it replaces, and in the absence of a perfect alignment of the vial in the frame, the level will be inaccurate.

Thus, a need exists for a spirit level having replaceable or interchangeable vial assemblies in which there is assurance that each replacement assembly will perfectly match the original, and is properly aligned in the frame so that reliance may be placed on the accuracy of the reconstituted level. Accordingly, it is an object of this invention to provide a level having these desirable characteristics, and to provide also a method or system for making such level structures. Another object of this invention is to provide a method of making spirit levels, wherein the bubble vial assemblies are all matched to a standard and set with reference thereto, and in which the level frames have characteristics equivalent to those of the standard whereby the vial assemblies may be used interchangeably therein.

Still another object is that of providing a method that comprehends the use of a standard or reference frame having an orienting edge and a level frame having an equivalent orienting edge, the vial assemblies having matched edges positioned on the standard frame orienting edge during setting of the vials whereby the assemblies are usable interchangeably in the level frames when the matched edges thereof are in position on the equivalent orienting edges since they are then automatically aligned therein. Yet another object is to provide in a method of making spirit levels, a reference frame having an orienting edge, a level frame having an equivalent orienting edge and a plurality of vial assemblies each having a matched edge—the bubble vials of each assembly being set when the matched edges are in contiguous relation with the reference frame orienting edge, and thereafter being removably mounted within the level frame with the matched and equivalent orienting edges in contiguous relation.

Still another object is that of providing a method of making vial assemblies for spirit levels, in which variations arising through manufacturing tolerances are accommodated as a part thereof without introduction of error into the readings of a completed level structure. Still a further object of the invention is that of providing a level having a frame and a vial assembly, and in which the vial assembly is automatically positioned in proper alignment within the frame as a part of the operation of mounting the assembly therein. Yet a further object is to provide a spirit level comprising a frame and a vial assembly, and in which the assembly is positively cammed into a predetermined relation with respect to the frame as the assembly is mounted therein, whereby proper alignment of the assembly in the frame is assured. Additional objects and advantages will become apparent as the specification develops.

An embodiment of the invention, both in terms of the structural and method concepts thereof, is illustrated in the accompanying drawing, in which—

Figure 1 is a side view in elevation of a spirit level embodying the invention;

Figure 2 is an enlarged broken side view in elevation of a portion of the level depicted in Figure 1;

Figure 3 is an enlarged broken vertical sectional view taken along the line 3—3 of Figure 2;

Figure 4 is a broken side view in elevation of a standard or reference frame having a plurality of vial assemblies mounted thereon to show the step of setting the bubble vials of such assemblies; and Figure 5 is a perspective view of a vial assembly.

It is believed that a description of the invention should first be directed to a structural recitation of the apparatus, followed by the procedure or steps involved in the provision of a level having interchangeable or replaceable vial assemblies. A spirit level in its entirety is shown in Figure 1, and comprises a frame 10 having mounted thereon a plurality of vial assemblies which are all identical but which, for purposes of differentiation, are designated respectively with the numerals 11a, 11b and 11c. The vial assemblies 11a and 11c are mounted at right angles with respect to the assembly 11b, and are used for vertical leveling—that is, determining any deviation from a true vertical line—while the assembly 11b is employed in horizontal leveling.

The frame 10 may take various forms and may be made from a number of suitable materials. In the exemplary form thereof shown, the frame is metal and has the configuration of an I-beam with a web 12 and flanges 13 and 14. The flanges 13 and 14 serve as the guide or leveling surfaces or edges of the frame, and the web 12 is provided with a plurality of longitudinally spaced openings therein, one for each of the vial assemblies and are designated, respectively, with the numerals 15a through 15c.

In terms of function, each of the openings 15 serves the same purpose—namely, that of permitting mounting of the respective vial assemblies in the frame 10—and in order to assure proper alignment of the vial assemblies, each opening is defined along one side thereof by an edge that will be referred to hereinafter as the equivalent orienting edge. These edges are designated, respectively, with the numerals 16a, 16b and 16c. The web 12 is also provided with an elongated slot for each of the openings 15, and such slots have their longitudinal axes arranged at right angles with respect to the equivalent orienting edges of the corresponding openings. Figures 2 and 3 illustrate one of the slots, and since it corresponds to the opening 15b, it is designated with the numeral 17b.

As stated, the vial assemblies are all identical and, as is most evident from Figures 2, 3 and 5, each has a vial holder 18 provided with a passage or bore 19 extending therethrough. Mounted within this passage 19 is a closed tube or bubble vial 20 having a bubble 21 centrally disposed therein. As is conventional, the vial 20 is arcuate so that the bubble 21 will be centered when the frame 10 is aligned along a horizontal line, and the vial is transparent so that the bubble is visible therein. The vial is mounted within the passage 19 by means of a material 22 such as plaster of paris, which is initially in a plastic state so as to permit setting of the vial and which thereafter hardens to anchor it in place. Intermediate the ends of the vial holder 18 and along the upper surface thereof is an arcuate recess 23 that permits sighting of the vial 20 and especially the bubble 21 thereof.

The lower end of the holder 18 is bifurcated to define spaced apart legs 24 and 25 that straddle a portion of the web 12 and serve to clamp the vial assembly thereon when the clamping screw 26 which extends through an opening 27 therefor in the leg 25, through the opening 17b and is threadedly received within the opening 28 in leg 24, is tightened. Disposed above the opening 27 in the leg 25 is a threaded opening 29 that receives a set screw 30 therein having a conical end that serves as a cam to force the vial assembly downwardly on the web 12 as the screw is tightened against the upper edge of the opening 17b. That edge may be thought of as a cam follower, and is denoted with the numeral 31. The limit of the downward movement of the vial assembly on the web 12 is determined by engagement of the equivalent orienting edge 16b of the flange with an edge 32 of the vial holder, which will be referred to hereinafter as a matched edge.

The remaining structure illustrated is not a part of the level, but is used in the method of setting the vials 20 in the holders 18. Such structure is illustrated in Figure 4 and comprises a reference or standard frame 33 having an orienting or reference datum edge 34 along the upper side thereof. The edge 34 is straight from end to end thereof and lies along a true horizontal line. Disposed below the orienting edge 34 are a plurality of elongated slots, the longitudinal axes of which are normal to the edge 34. These slots correspond to those provided by the web 12 of the level frame and are designated with the numerals 35a through 35c.

In constructing the level, the frame 10 is made so that the outer surfaces of the flanges 13 and 14 are parallel, and it is essential that the equivalent orienting edge 16b in the web be parallel to these flanges. Also, the equivalent orienting edges 16a and 16c must be perpendicular to the outer surfaces of the flanges 13 and 14 and, therefore, normal to the edge 16b. Otherwise, the configuration of the openings 15 in the web is unimportant so long as those openings are large enough to permit mounting of the vial assemblies. The reference or standard frame 33 provides a true horizontal orienting edge 34, and the equivalent orienting edges 16 correspond thereto.

Following fabrication of the vial holders 18, they are placed on the reference frame 33 with the spaced legs 24 and 25 straddling the reference frame, with the result that the orienting edge 34 and matched orienting edge 32 of each holder are in adjacent relation. Next, the screws 26 and the cam screws 30 are threaded into the respective openings therefor in the vial holders. The screws 26 first are preferably tightened only sufficiently to prevent the legs 24 and 25 from being subsequently spread. The cam screws 30, however, are rotated so that the conical ends thereof enter the respective slots 35 and forcefully pull the vial holders downwardly as a result of the camming engagement between the screw ends and the cam follower edge 31 of the slots. This downward movement of the vial holders continues until the orienting edges 32 are in contiguous or tight abutting relation, it being understood that the vial holders are thus secured to the reference frame by what is, in effect, a three point mount— two of the points being the opposite ends of the line of contact between the surface 32 on each holder and the orienting edge 34 of the frame, and the third point being the point at which the camming end of each screw 30 contacts the respective follower edges 31 of the slots 35. During this forceful camming action, the screw 26 in each instance prevents the legs 24 and 25 from tending to be spread, thus permitting the structure of the vial holders to be much less massive than would otherwise be necessary.

Next, the vials 20 are placed within the passages 19 of the respective vial holders and are surrounded by the bonding material 22. Each vial is adjusted until the bubble 21 thereof is perfectly centered. The bonding material is then permitted to harden. After hardening of the bonding material, the vial assemblies may be removed from the reference frame 33, and can be interchangeably mounted within the frame 10 or in any duplicate thereof. That is to say, any vial assembly so set on the reference frame 33 may be used in any level frame 10, and each of the vial assemblies is usable in any of the openings 15. To mount the vial assemblies in the level frame, the procedure described is repeated and the spaced legs 24 and 25 are placed in straddling relation with the web 12, the cam screws 30 are tightened forcefully to bring the equivalent orienting edges 16 and the respective matched orienting edges 32 into contiguous relation.

Again, during the forceful camming of surfaces 32 of the vial holders downwardly into contact with the orienting edges 16, the screws 26 prevent the legs 24 and 25 of the holders from spreading. The forceful engagement of the conical ends of the cam screws 30 with the cam follower edges 31 of the slots 17 in the web of the level secures and locks the vial holders upon the level in the same sense that they were previously locked upon the reference frame 33, as explained above. After the vial holders have been locked or secured upon the level, as just described, the screws 26 may be further tightened, if desired, in order to clamp the legs 24 and 25 of each holder against the opposite faces of the web 12. This subsequent tightening of the screws 26, however, is recommended only in cases where the normal space between the legs 24 and 25 is substantially the same as the thickness of the web 12. It will be apparent that if replacement of any of the vial assemblies is required, it is simply removed from the frame 10 and its counterpart mounted thereon.

There is always complete assurance that the readings provided by the level will be accurate, for each vial assembly is set with respect to the standard reference edge 34 and when the vial assemblies are mounted in a frame 10 with the matched edges 32 contiguous with the equivalent orienting edges 16, perfect alignment of the vial assemblies results and no possibility of inaccuracy in the level readings can appear. It should be noted that any variations appearing in the vial holders 18 which, for example, might be due to manufacturing tolerances, do not adversely influence the accuracy of the level for the vial is always set with reference to the orienting edge 34 of the standard frame when the matched orienting edge 32 of the vial holder is contiguous therewith. Consequently, even though the matched edge of a vial holder might be askew with reference to the longitudinal axis of the passage 19, the vial itself is still set in accordance with the reference orienting edge 34, and since such edge is duplicated by the equivalent orienting edges 16 of the level frame, each vial in effect is set with respect thereto.

While in the foregoing specification an embodiment of the invention has been described in considerable detail both with reference to a method and structure for purposes of providing an adequate disclosure thereof, it will

I claim:

1. In a level structure having a frame providing a web having a work leveling edge extending along said web, a vial assembly comprising a vial holder having spaced apart legs adapted to straddle said web and defining a matched orienting edge therebetween, said assembly comprising also a bubble vial anchored in said vial holder and set with respect to the matched orienting edge, said web having an orienting edge, and means for urging said vial holder into a position such that the matched orienting edge thereof is contiguous with the orienting edge of said web and for releasably retaining said vial holder in said position.

2. The structure of claim 1 in which said means for urging said vial holder comprises a screw cam carried by said vial holder and a cam follower surface engageable therewith provided by said web.

3. The structure defined by claim 2, including means for preventing the spreading of said legs during forceful engagement of said screw cam and said cam follower surface.

4. In a level, a level frame having a web provided with an opening therein defining an orienting edge along one side thereof, said web having a slot disposed intermediate the ends of said orienting edge and spaced therefrom, a vial holder having spaced apart legs straddling said web and defining a matched orienting edge therebetween, a cam screw adjustably carried by one of said legs and having an end thereof extending into said slot for engagement with an edge thereof such that progressive insertion of the cam screw into the slot urges said matched orienting edge into tight abutting relation with the orienting edge of the web, and a bubble vial carried by said vial holder.

5. The structure of claim 4 in which said bubble vial is secured in said vial holder with the bubble thereof set with respect to said matched orienting edge.

6. The structure of claim 4, including retaining means engaging each of said legs of said vial holder for preventing the spreading thereof during forceful engagement of said end of said screw and said edge of said slot.

7. A standard for use in making vial assemblies interchangeably usable in a spirit level structure, comprising a reference frame having an orienting edge disposed along a true horizontal line, said reference frame being provided with a slot disposed below said orienting edge in spaced apart relation therealong, said orienting edge being adapted to receive matched orienting edges of a vial assembly thereon and said slot being adapted to function as a cam follower in cooperation with a cam screw carried by such vial assemblies to urge the matched orienting edges into contiguous relation with the orienting edge of said reference frame.

References Cited in the file of this patent

UNITED STATES PATENTS

| | | |
|---|---|---|
| 324,323 | Howard | Aug. 11, 1885 |
| 778,808 | Starrett | Dec. 27, 1904 |
| 1,823,524 | Beecher et al. | Sept. 15, 1931 |
| 2,305,678 | Cravaritis et al. | Dec. 22, 1942 |
| 2,495,646 | Schultes et al. | Jan. 24, 1950 |